United States Patent [19]
Parimore, Jr. et al.

[11] Patent Number: 5,344,195
[45] Date of Patent: Sep. 6, 1994

[54] BIASED FLUID COUPLING

[75] Inventors: Thomas N. Parimore, Jr., West Chester; Gerald A. Pauley, Hamilton, both of Ohio

[73] Assignee: General Electric Company, Cincinnati, Ohio

[21] Appl. No.: 921,870

[22] Filed: Jul. 29, 1992

[51] Int. Cl.⁵ .............................................. F16L 19/00
[52] U.S. Cl. ...................................... 285/91; 285/340; 285/353
[58] Field of Search ................. 285/340, 353, 354, 91

[56] References Cited

U.S. PATENT DOCUMENTS

| | | | |
|---|---|---|---|
| 582,022 | 5/1897 | Nixon | 285/340 |
| 1,725,975 | 8/1929 | Bystricky | 285/340 |
| 1,899,119 | 2/1933 | Singer | 285/340 |
| 1,957,605 | 5/1934 | Lamont | 285/120 |
| 2,709,093 | 5/1955 | Zeeb | 285/120 |
| 3,201,149 | 8/1965 | Bragg | 285/39 |
| 4,170,163 | 10/1979 | Payne | 85/62 |
| 4,609,314 | 9/1986 | Metz | 411/7 |
| 4,940,260 | 7/1990 | Odriozola | 285/3 |
| 5,082,245 | 1/1992 | Kast | 251/149.6 |
| 5,083,819 | 1/1992 | Bynum | 285/89 |
| 5,188,398 | 2/1993 | Parimore, Jr. et al. | 285/39 |

FOREIGN PATENT DOCUMENTS 708706 7/1931 France .
433317 6/1974 U.S.S.R. .............................. 285/353

OTHER PUBLICATIONS

F. Rodriguez, *Principles of Polymer Systems*, McGraw-Hill, Inc., New York, N.Y., 1970; pp. 37, 528–530.

M. J. Kroes et al., *Aircraft Powerplants*, 6th Edition, Glencoe/McGraw-Hill, Westerville, Ohio, 1990; p. 282.

Primary Examiner—P. Austin Bradley
Assistant Examiner—Jeffrey T. Knapp
Attorney, Agent, or Firm—David L. Narciso; Jerome C. Squillaro

[57] ABSTRACT

A method and apparatus for achieving a fluid tight seal of a fluid coupling having an axis, wherein a spring interposed between a coupling nut and an inner member of a first coupling element is compressed when the coupling nut is engaged with a second coupling element and rotated in a tightening direction such that complementary sealing surfaces between the first and second coupling elements are axially pre-loaded to achieve a fluid tight seal. A fluid tight seal is dependent on the axial compression of the spring, indicated by the axial location of the coupling nut with respect to the inner member and second coupling element, and is visually indicated by the rotational relationship of the coupling nut and the second coupling element.

9 Claims, 3 Drawing Sheets

BIASED FLUID COUPLING

The Government has rights in this invention pursuant to Contract No. F33657-83C-0281, awarded by the Department of the Air Force.

FIELD OF THE INVENTION

This invention relates to couplings and more particularly to a fluid coupling providing a reliable fluid-tight connection with a visual indication of the axial load between the coupling elements.

BACKGROUND OF THE INVENTION

Coupling systems for interconnecting lines, particularly fluid conveying lines, must provide reliable service even in adverse operating conditions. For example, the couplings for fluid lines associated with the hydraulic, fuel, or other systems of aircraft are subjected to vibration, temperature extremes, axial loading and a variety of other difficult operating conditions. Reliably insuring such couplings are properly connected is essential to safe operation as failure of such couplings or their improper installation could lead to catastrophic results.

Shown in FIG. 1 is a typical fluid coupling 8 comprising a coupling element 9 having a ferrule 10 with a frustoconical seat 11, which acts as a sealing surface, and a second coupling element 12 comprising a ferrule with a complementary sealing surface, depicted as a ball nose surface 13. Coupling elements 9 and 12 are joined together by a coupling nut 14 on the first coupling element 9 being threaded onto threads of the second coupling element 12 and tightened, transmitting axial forces from the coupling nut 14 through a load bearing surface 15 to the complementary sealing surfaces 11 and 13. This axial compression forces these complementary sealing surfaces together to achieve a pre-load of one surface against the other such that the surfaces will remain fluid tight through the operational environment of the fluid coupling. Thread torque is conventionally used as a measure of whether an appropriate compressive pre-load of the sealing surfaces to achieve the fluid-tight seal has been reached, and also as a measure that the threaded surfaces are sufficiently engaged to prevent loosening. Loosening of an engaged and torqued coupling is also accomplished by the use of lockwire and other apparatus, such as disclosed in co-pending application Ser. No. 07/815,998, now U.S. Pat. No. 5,188,398, *Redundantly Locked Fluid Coupling*, to Parimore, et al. incorporated herein by reference. While it is important for the coupling elements to be tightened sufficiently to form a fluid-tight seal, it is also essential that the elements not be overtightened. Overtightening of a coupling can lead to not only weakening and failure of the threads of either coupling element, but also to plastic deformation of either the seat or mating sealing surface, or both.

The problem of applying the proper amount of axial pre-load to mating coupling elements has been addressed by providing assembly personnel with torque wrenches designed for a given coupling. However, this solution often produces less than desired results in practice. It is not unusual for a mechanic or other assembler to employ the wrench or other tool at hand, rather than search for the torque wrench designed for a given coupling. This results in an unreliable estimate of the amount of torque and the potential for either overtightening and failure of the coupling or undertightening and a potential loosening and leakage of the coupling elements. Even if the appropriate torque wrench is employed, proper seating pre-load to assure a leak-free joint is not guaranteed. A torque wrench measures the amount of torque applied to a coupling. The torque wrench does not measure the amount of axial seating pre-load a joint receives. It is this axial seating load that assures a leak-free joint. Torque vs. axial seating pre-load is a function of many variables. With today's couplings it is possible, with damaged threads for example, to torque a fitting to the proper torque range and still not achieve the proper seating pre-load.

In addition to torque not being a reliable measure of axial seating pre-load, aircraft threaded connections are subjected to vibration and other operating conditions which make such connections susceptible to loosening after a period of time, thus no longer providing a fluid-tight connection. In many coupling designs, such loosening of the coupling elements cannot be visually detected and maintenance personnel often check on the integrity of the coupling connection by taking the coupling apart and then retightening it with the appropriate torque wrench or other means. This can increase the time and cost of maintenance particularly in instances where the coupling elements have not in fact become loosened and could have been left intact.

SUMMARY OF THE INVENTION

In accordance with the present invention, it is desirable to provide a simple and reliable coupling system that will enable a fluid coupling to be reliably connected and tightened to provide the appropriate axial seating pre-load between coupling elements to achieve a fluid tight seal. It is also desirable that the coupling system provide for reliable installation without plastic deformation of the coupling elements or tightening means. It is additionally desirable to eliminate the need for torque wrenches in achieving a fluid-tight seal between coupling elements, and to provide a visual indication of a fluid-tight seal being achieved. It is further desirable to provide such a coupling within the same axial length of present coupling elements.

The present invention provides a coupling for reliably achieving a fluid-tight seal with a coupling having two coupling elements including complementary sealing surfaces. One of the coupling elements further includes a coupling nut with a spring interposed between the coupling nut and a surface extending outward proximate the sealing surface. The other coupling element includes means for engaging the coupling nut such that rotating the coupling nut in a tightening direction causes the complementary sealing surfaces to become engaged and compresses the spring, in turn forcing the complementary sealing surfaces together to achieve at least the desired pre-load to insure a fluid-tight seal.

An alternate embodiment in accordance with the present invention provides the coupling nut as including a pair of tab keys extending radially inward for engaging the second coupling element, and the engagement means of the second coupling element including a circumferentially extending cam surface which is sloped in an axial direction for a portion to achieve the desired compressive movement of the coupling nut to pre-load the complementary sealing surfaces and a portion with less axial slope extending to a stop pin such that less than one full rotation of the coupling nut is required to achieve the fluid-tight seal, with the coupling nut being prevented from over-rotation and disengagement with the cam surface.

These and other features and advantages of the present invention will become apparent to those skilled in the art from the detailed description of the preferred embodiments when taken in conjunction with the accompanying drawings.

BRIEF DESCRIPTION OF THE DRAWINGS

In the course of the following description, reference will be made to the accompanying drawings in which.

DETAILED DESCRIPTION OF THE PREFERRED EMBODIMENT

Figure 1:
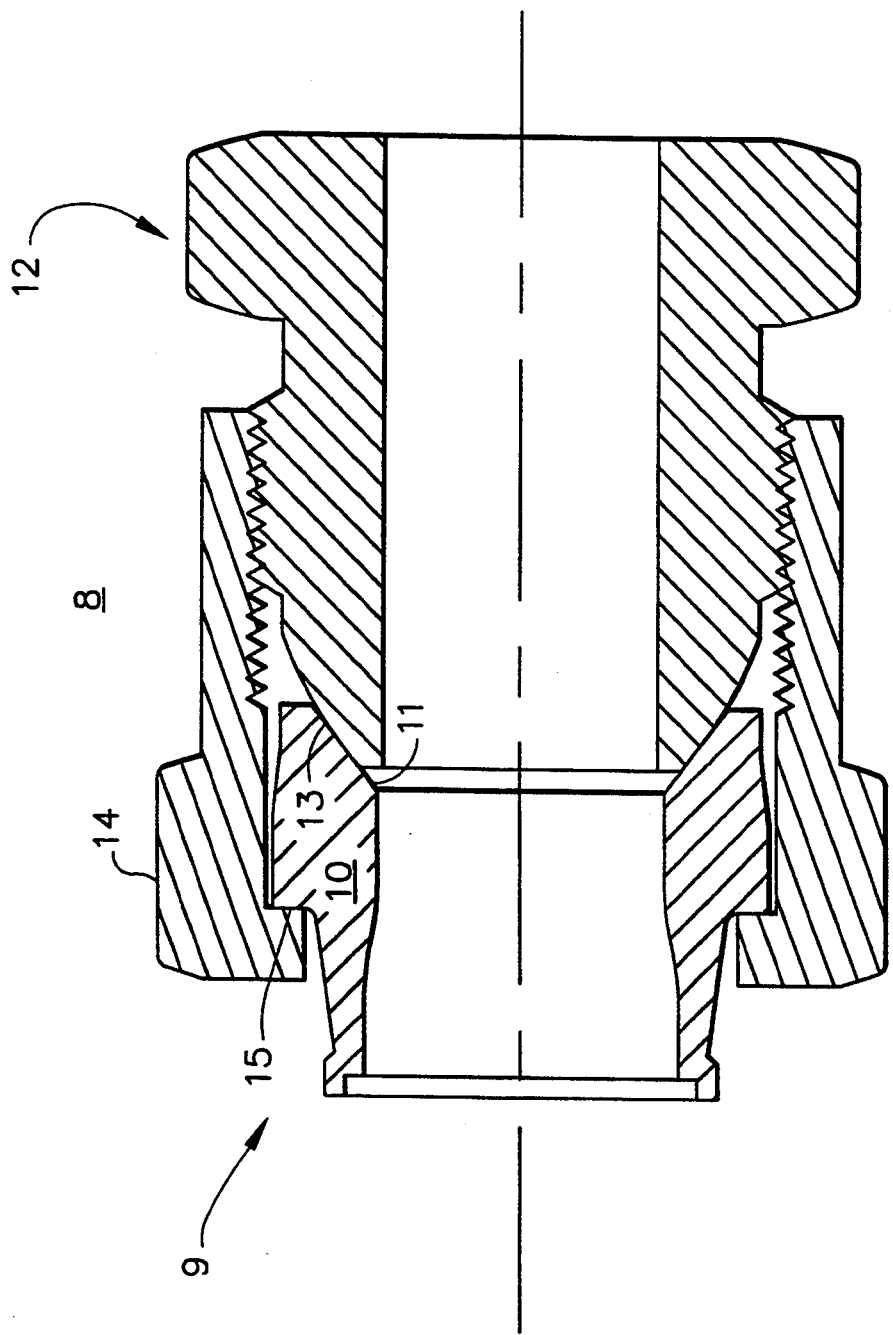
FIG. 1 is an illustration of a cross-sectional view of a typical ball nose fluid coupling.

Like reference numerals have been used to designate like or corresponding parts throughout the several views.

Figure 2:
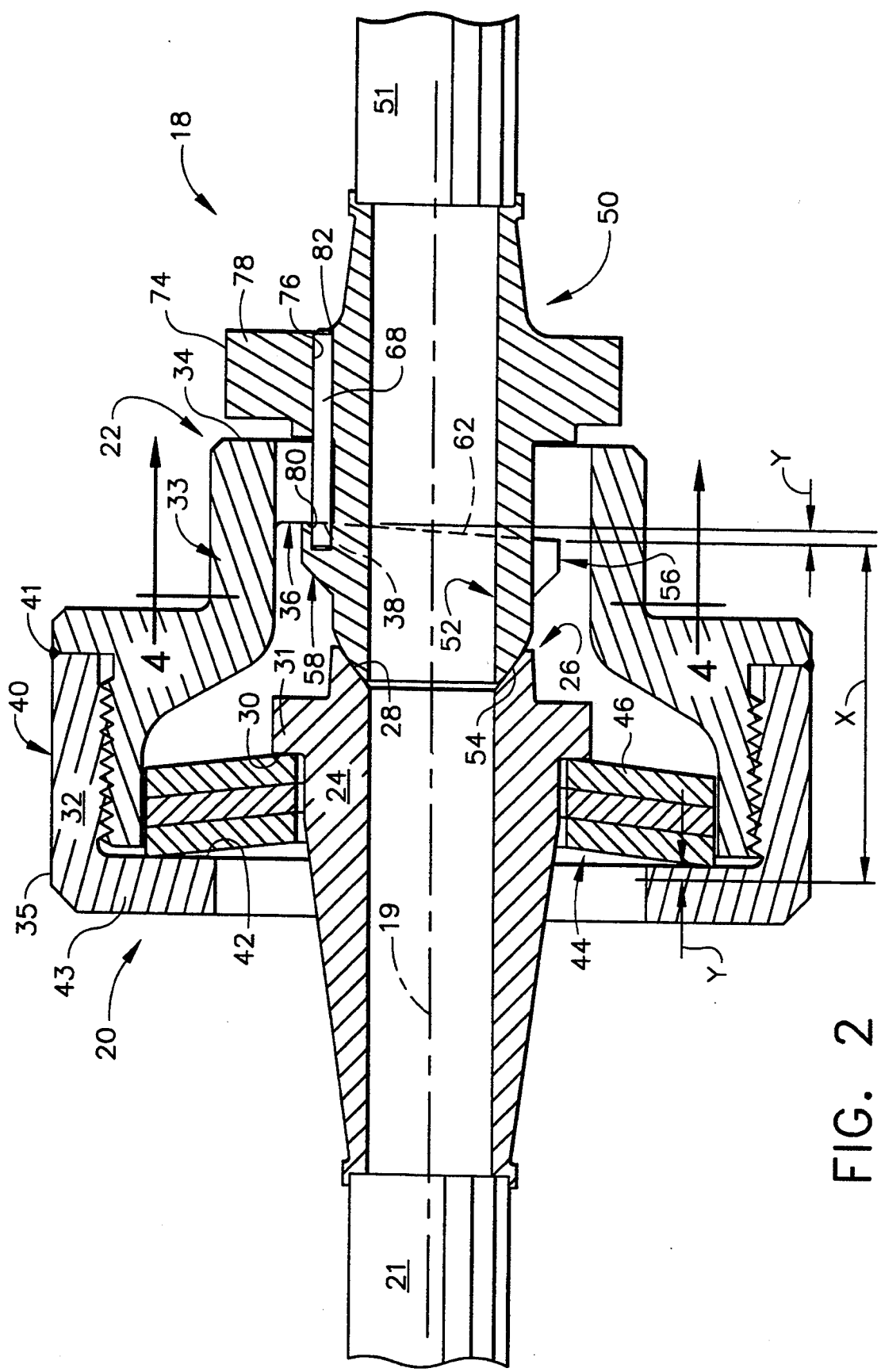
FIG. 2 is an illustration of a cross-sectional view of an assembled and tightened fluid coupling of the present invention.

FIG. 2 shows an illustration of a cross-sectional view of a fluid coupling 18 which is particularly useful on aircraft gas turbine engines not shown. Coupling 18 has a longitudinal axis 19 and comprises a first coupling element 20, affixed to fluid line 21, coupled to a second coupling element 50, affixed to fluid line 51. First coupling element 20 includes a first end portion 22 with a ferrule inner member 24 having a first end 26 including a frustoconical seat 28. Facing away and extending radially outward from said inner member proximate said inner member first end is a biasing surface 30 on flange 31. A coupling nut 32 surrounds the inner member having a first end 34 including a pair of tab keys 36 extending radially inward from the coupling nut proximate the coupling nut first end. Each tab key 36 includes a dry film lubricated circumferential cam follower surface 38. A housing section 40 extends axially away from the coupling nut first end 34 with a biasing surface 42 on a circumferential flange 43 extending radially inward from the housing section 40 distal the coupling nut first end 34. The coupling nut biasing surface 42 is biased away from the inner member first end 26 by means for biasing 44 interposed between the coupling nut and the inner member biasing surfaces. In the preferred embodiment, coupling nut 32 includes a first coupling nut member 33, including tab keys 36, and a second coupling nut member, 35, including circumferential flange 43, with mating threads such that biasing means 44 may be mounted on inner member 24 and the first and second coupling nut members assembled to capture biasing means 44 and inner member 24, with a circumferential weld 41 to retain the assembled coupling nut members together. The assembled coupling nut 32 is retained on inner member 24 by tab keys 36 having an inner diameter smaller than the diameter of flange 31. Further, the preferred means for biasing 44 comprises a series of disc springs 46. Second coupling element 50 includes a ferrule 51 with a first end portion 52 having a sealing segment 54 comprising a conventional fluid coupling ball nose. The second coupling element 50 includes means 56 for engaging the coupling nut tab keys 36 including a radially extending flange 58.

Figure 4:
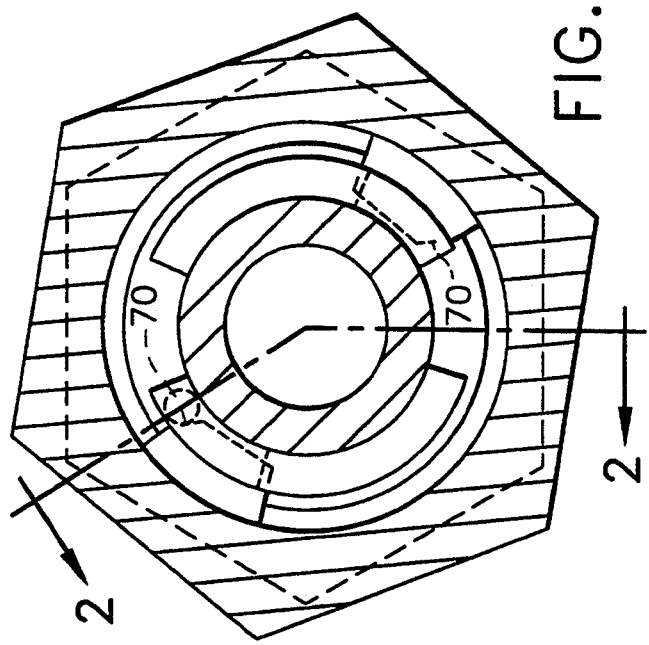
FIG. 4 is an illustration of a cross-sectional view of the coupling of FIG. 2 along lines 4—4, depicting the coupling after rotation of the coupling nut to a tightened position.
Figure 5:
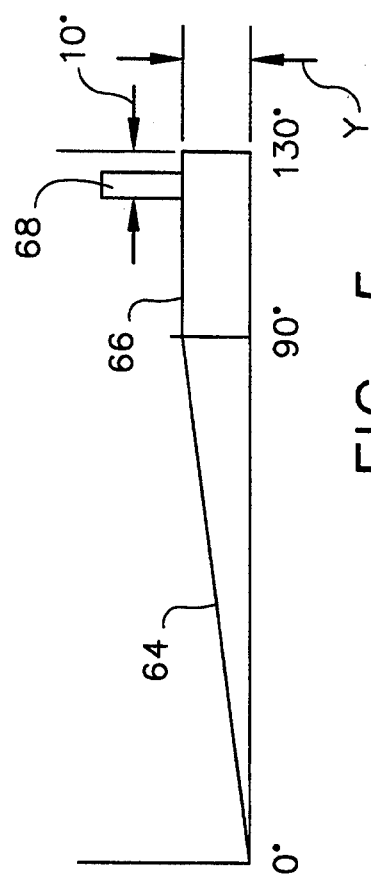
FIG. 5 is a schematic representation of the axial slope of the cam surface of the coupling nut.
Figure 3:
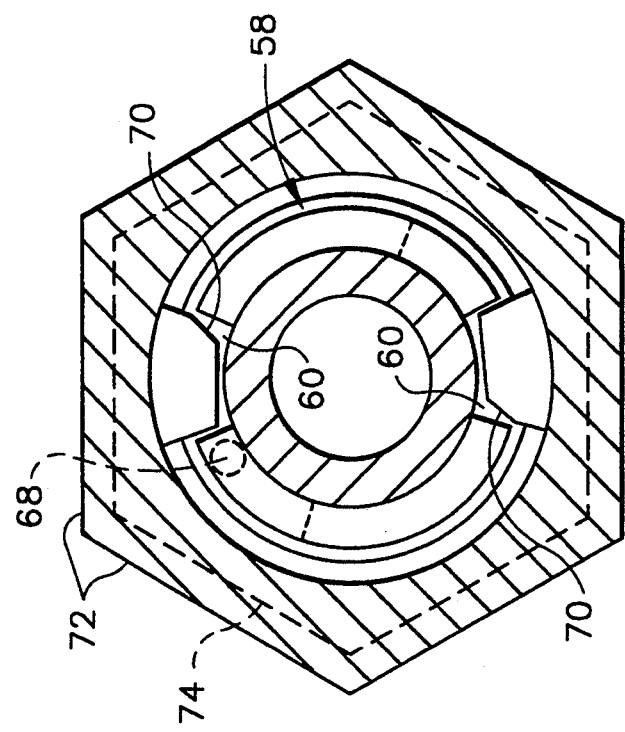
FIG. 3 is an illustration of a cross-sectional view of FIG. 4 of the coupling prior to tightening.

Referring now to FIG. 3, an illustration of a cross-sectional view of the coupling prior to tightening, as compared to FIG. 4, an illustration of a cross-sectional view along lines 4—4 of FIG. 2, the coupling is depicted with tab keys 36 inserted in a pair of axially extending keyways 60 in radially extending flange 58. The radially extending flange 58 is further shown as including a circumferential cam surface 62 which is a dry film lubricated surface having an axially ramped portion 64 circumferentially continuous with a portion having less of an axial slope 66. FIG. 5 schematically depicts the axial slope of the circumferential cam surface 62 as having the axially ramped portion 64 with an axial slope through approximately 90° of rotation circumferentially continuous with a cam surface having a flat slope 66 from about 90° to about 130°. Means for preventing over-rotation of coupling nut 32 include, in the preferred embodiment, an axially extending stop pin 68 affixed to one of the circumferential cam surfaces 62, as shown in FIG. 2. Stop pin 68 is installed in second coupling element 50 through shaft 76 in flange 78 so as to engage both bore 80 in circumferential cam surface 62 and shaft 76, and retained in place by weld 82. Referring again to FIGS. 3 and 4, tab keys 36 include an axial chamfer 70 not aligned with a radius extending from axis 19 of fluid coupling 18. Stop pin 68 is further shown in FIG. 5 as preventing about 10° of circumferential rotation on the circumferential cam surface 62, leaving about 120° of rotation available.

Fluid coupling 18 is assembled by first engaging coupling nut tab keys 36 with axially extending keyways 60 as shown in FIG. 3, and moving the coupling nut axially until rotation will engage the coupling nut tab keys' cam follower surfaces 38 with circumferential cam surfaces 62. The axial distance X, shown in FIG. 2 as the distance between coupling nut biasing surface 42, prior to tightening, and the axial start point of circumferential cam surface 62, with tab keys 36 extended through keyways 60, should not cause compression of biasing means 44, or only such compression as can be easily accomplished, such that cam follower surface 38 can be initially engaged with circumferential cam surface 62 without, in a preferred embodiment, the aid of tools. Rotation of coupling nut is accomplished by engaging a conventional wrench, not shown, with wrench flats 72 on coupling nut 32 and a second conventional wrench, not shown, with wrench flats 74 on flange 78 on second coupling element 50 and rotating coupling nut 32 in a tightening direction until chamfer 70 engages stop pin 68. Rotation of coupling nut 32 causes coupling nut tab key circumferential cam follow surface 38 engaging second coupling element circumferential cam surface 62 to provide coupling nut 32 with an axial movement Y, the axial distance of ramped portion 64. This axial travel of the coupling nut 32 with respect to inner member 24 and second coupling element 50 causes the biasing means 44 to be compressed between coupling nut biasing surface 42 and inner member biasing surface 30. The compression of biasing means 44 within the axial travel Y causes biasing surface 42 to be forced away from first coupling element inner member biasing surface 30, in turn engaging and obtaining an axial pre-load of frustoconical seat 28 with sealing segment 54 such that a fluid-tight seal is achieved. Factors to be considered in designing a biased fluid coupling include the type of biasing means, the axial distance the coupling nut will travel when compressing the biasing means, and the material properties of materials used for the coupling elements. As the compressive force of conventional biasing means is directly proportional to the distance compressed or stretched, safety factors can be built into the design such that a minimum compressive force for achieving a fluid tight seal, wherein elastic deformation of the complementary sealing surfaces occurs, will always be achieved within a readily ascertainable movement of coupling nut 32, without overloading and causing plastic deformation of the complementary sealing surfaces or other coupling members, such as tab keys 36 and cam surfaces 62, subject to forces resulting from compressing the biasing means 44 through axial distance Y.

In the preferred embodiment, the coupling nut 32 is rotated from the position depicted in FIG. 3 such that the tab key cam follower surfaces 38 move along the axially ramped portion 64 of the circumferential cam surfaces 62 one-quarter turn or 90°, providing axial movement Y, achieving the desired pre-load. The coupling nut 32 is then rotated an additional 30°, moving the cam follower surfaces 38 along a circumferentially continuous portion with a flat axial slope 66 until chamfer 70 engages stop pin 68 as shown in FIG. 4. It is therefore readily ascertainable that the coupling has been properly engaged by the amount of rotation of the coupling nut 32. By having the axial chamfer 70 offset from a radius of the coupling nut 32, the circumferential position of coupling nut 32 with respect to second coupling element is retained, as the chamfer 70 engaging the stop pin 68 forces chamfer and tab key 70 of tab key 36 radially outward instead of in a circumferential untightening direction. In addition, to compressive forces between the cam and cam follower surfaces, conventional means of retaining the circumferential position of coupling nut with respect to second coupling element 50 could include conventional lockwire or other means such as disclosed in co-pending application Ser. No. 07/815,998, also assigned to the same assignee as the present invention. In the preferred embodiment, three disc springs 46 are used in series to achieve high pre-loading in a short axial distance, thus providing a coupling capable of achieving a fluid tight seal in the same axial distance as conventional couplings. Other biasing means for obtaining the desired pre-load within a predetermined axial distance in which coupling nut 32 can move would be appropriate.

Fluid tight sealing engagement of the coupling 18 is readily ascertained by the relative rotational position of coupling nut 32 compared to second coupling element hex flats 74. Any type of visual indicators of this relative rotational position would be appropriate. Further, if a biasing means 44 required more axial movement to achieve the required pre-load, such as a conventional coil spring, conventional screw threads could be used in conjunction with visual indicators to indicate axial movement, of the coupling nut 32, as compared to rotational movement.

The present invention and many of its intended advantages will be understood from the foregoing description and it will be apparent that various changes may be made in the form, construction, and arrangement of the parts thereof without departing from the spirit and scope of the invention or sacrificing its material advantages, the apparatus hereinabove described being a preferred and exemplary embodiment.

We claim:

1. A gas turbine engine fluid coupling having a longitudinal axis, said coupling comprising:
   (a) a first coupling element having a first end portion including an integral seat;
   (b) a second coupling element having a first end portion including an integral sealing segment for sealingly engaging said seat;
   (c) one of said first and second coupling elements further comprising
      (1) an inner member having a first end including one of said seat and said sealing segment, and further including a biasing surface facing away and extending radially outward from said inner member first end,
      (2) a coupling nut having a first end, a housing section extending axially away from said coupling nut first end, and a biasing surface extending radially inward from said housing section distal said coupling nut first end, and
      (3) means for biasing said coupling nut biasing surface away from said inner member first end interposed between said coupling nut biasing surface and said inner member biasing surface;
   (d) the other of said first and second coupling elements further comprising means for engaging said coupling nut;

such that engaging said coupling nut with said engagement means and rotating said coupling nut in a tightening direction causes compressive axial movement of said coupling nut with respect to said inner member, engaging said biasing means with said biasing surfaces and compressing said biasing means, forcing said seat and said sealing segment together to achieve a fluid tight seal.

2. The fluid coupling of claim 1 wherein fluid fight engagement of said seat and said sealing surface is indicated by the rotational relationship of said coupling nut and said other of said first and second coupling elements, wherein fluid tight sealing engagement is obtained by engaging said coupling nut with said engagement means and rotating less than one complete turn in a tightening direction.

3. The fluid coupling of claim 1 further comprising:
   (a) said engagement means including a radially extending flange including an axially extending keyway and a circumferential cam surface having an axially ramped portion;
   (b) a tab key extending radially inward from said coupling nut, proximate said coupling nut first end, said tab key including a circumferential cam follower surface;
   (c) such that said coupling nut tab key may be inserted through said keyway to engage said cam follower surface on said cam surface and rotating said coupling nut causes said compressive axial movement of said coupling nut.

4. The fluid coupling of claim 3 wherein said first coupling element includes said coupling nut and said biasing means, said second coupling element includes said engagement means, and said biasing means comprises a disc spring.

5. The fluid coupling of claim 3 wherein said cam surface and said cam follower surface are each a dry film lubricated surface.

6. The fluid coupling of claim 3 wherein said cam surface ramped portion is circumferentially continuous with a portion having a different axial slope for retaining said coupling nut in an axial position such that said fluid tight seal is retained.

7. The fluid coupling of claim 5 wherein:
 (a) said second coupling element includes an axially extending stop pin affixed to said circumferential cam surface; and
 (b) said coupling nut tab key includes an axial chamfer;
whereby over-rotation of said coupling nut is prevented by said axial chamfer engaging said stop pin.

8. In a gas turbine engine, a fluid coupling having a longitudinal axis, said coupling comprising:
 (a) a first coupling element including:
  (1) an inner member having a first end including an integral seat and a biasing surface facing away and extending radially outward from said inner member first end,
  (2) a coupling nut including:
   (i) a first end including a pair of tab keys extending radially inward, said tab keys each including a circumferential cam follower surface and an axial chamfer,
   (ii) a housing section extending axially away from said coupling nut first end, and
   (iii) a biasing surface extending radially inward from said housing section distal said coupling nut first end, and
  (3) means for biasing said coupling nut biasing surface away from said inner member biasing surface interposed between said coupling nut biasing surface and said inner member biasing surface; and
 (b) a second coupling element including:
  (1) a first end including an integral sealing segment for sealingly engaging said seat, and
  (2) means for engaging said coupling nut tab keys, including:
   (i) a pair of keyways,
   (ii) a pair of circumferential cam surfaces including
    A. a portion with an axial slope, and
    B. a portion circumferentially continuous with said sloped portion having less slope; and
   (iii) a stop pin fixedly attached to one of said cam surfaces;
such that fluid tight engagement of said coupling is achieved by aligning said coupling nut tab keys with said second element keyways, engaging said tab key cam follower surfaces with said cam surfaces, and rotating said coupling nut until one of said chamfers engages said stop pin, providing axial movement of said coupling nut with respect to said inner member and said second coupling element to engage said seat and said sealing surface and to compress said biasing means to pre-load said seat and said sealing surface.

9. The fluid coupling of claim 8 wherein rotation of said coupling nut from said keyway to said stop pin is about 120 degrees.

* * * * *